Apr. 10, 1923.
J. A. RUAN
SIGNAL
Filed Jan. 9, 1922
Fig. 1.
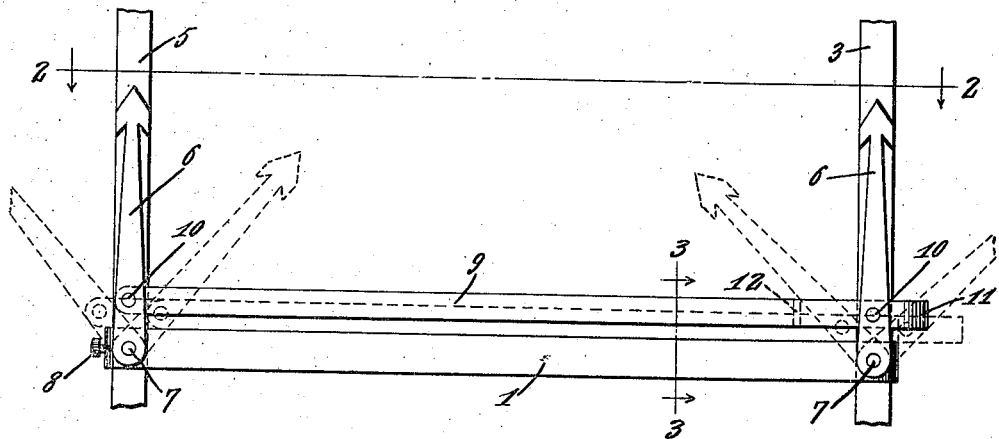
Fig. 2.
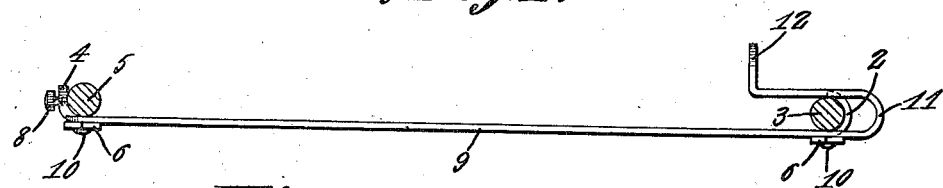
Fig. 3.
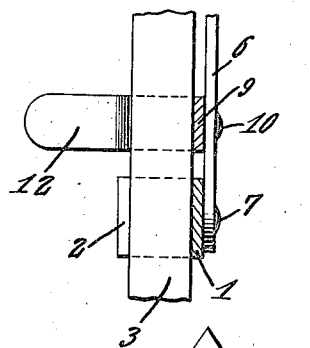
Fig. 4.
Fig. 5.
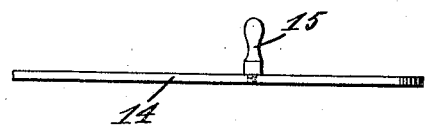
J. A. Ruan, Inventor Patented Apr. 10, 1923.

1,451,053

UNITED STATES PATENT OFFICE.

JOHN A. RUAN, OF BEACON, IOWA.

SIGNAL.

Application filed January 9, 1922. Serial No. 527,967.

*To all whom it may concern:*

Be it known that I, JOHN A. RUAN, a citizen of the United States, residing at Beacon, in the county of Mahaska and State of Iowa, have invented a new and useful Signal, of which the following is a specification.

The device forming the subject matter of this application is a signal and the invention aims to provide novel means whereby the driver of a motor propelled vehicle, can convey to pedestrians and to the drivers of other vehicles, information of the sort required by traffic laws.

The invention aims to provide novel means for mounting and operating the signal arms, and to provide novel means for attaching the device to a vehicle.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in elevation, a device constructed in accordance with the invention; Figure 2 is a section on the line 2—2 of Figure 1; Figure 3 is a section on the line 3—3 of Figure 1; Figure 4 is a fragmental plan showing a modification; Figure 5 is a rear elevation showing a portion of one of the arms.

The structure forming the subject matter of this application may be attached to a vehicle in various ways depending upon the make of the vehicle. If desired, the device may include a base member 1, in the form of a bar, provided at one end with a hook-shaped retainer 2, adapted to be engaged about one part 3 of a wind shield frame, the member 1 being provided at its opposite end with an angularly disposed lip 4 extended transversely of the other post 5 of the wind shield frame. A set screw 8 may be threaded into the lip 4, the set screw being adapted to cooperate with the post 5, to hold the base member 5 in place.

Signal arms 6 are provided, the same being pivoted at their lower ends, as shown at 7 to the base bar 1. The signal arms 6 are so pivoted, with respect to the lip 4 and the retainer 2, that, when the signal arms are in vertical positions, the signal arms will be alined with the posts 3 and 5 of the wind shield frame. The signal arms 6 are connected by a link 9, the link being pivoted at 10 to the signal arms, intermediate the ends of the signal arms. The link 9 is located directly above the base member or bar 1. At one end, the link 9 may be supplied with a U-shaped operating handle 11 extended around the post 3, and terminating in an angularly disposed grip 12, the construction being such that the link may be actuated readily, from the wind shield.

When the device is not in use, the signal arms 6 are alined with the posts 3 and 5 of the wind shield frame. Through the instrumentality of the grip 12, the link 9 may be moved endwise in opposite directions, the signal arms 6 being swung either to the left or to the right. The link 9 moves downwardly into contact with the base member 1, to limit the swinging movement of the signal arms 6, either to the left or to the right.

Each signal arm 6 is provided on its rear surface with a sign reading "Stop", the device, therefore, being adapted for use as a stop signal.

In Figure 4, the link is marked by the numeral 14 and is provided intermediate its ends with a handle 15, taking the place of the grip 12.

Having thus described the invention, what is claimed is:

1. In a device of the class described, a base member; means for mounting the ends of the base member on a vehicle, signal arms pivoted at their lower ends to the base member; a link pivoted to the signal arms and located directly above the base member, whereby when the link is moved longitudinally, the link will come into contact with the base member, thereby limiting the lateral swinging movement of the signal arms; and means for operating the link.

2. In a device of the class described, a base member; signal arms pivoted at their lower ends to the base member; and a link pivoted to the signal arms, the link being provided at one end with a U-shaped handle prolonged to the rear of the link.

3. In a device of the class described, a base member provided at its ends with retainers adapted for engagement with posts of a wind shield frame; signal arms; a link pivoted to the signal arms; and pivot elements uniting the signal arms with the base member, the pivot elements being so located with respect to the retainers that when the signal arms are vertically disposed, the signal arms, will be alined with the posts of a wind shield frame wherewith the retainers coact.

In testimony that I claim the foregoing as my own, I have hereto affixed my signature in the presence of two witnesses.

JOHN A. RUAN.

Witnesses:
 CLARENCE OGDEN,
 FRANK T. NASH.